May 23, 1950 F. T. POWERS 2,508,649
SPIRAL FOCUSING SCALE
Filed April 4, 1947 3 Sheets-Sheet 1
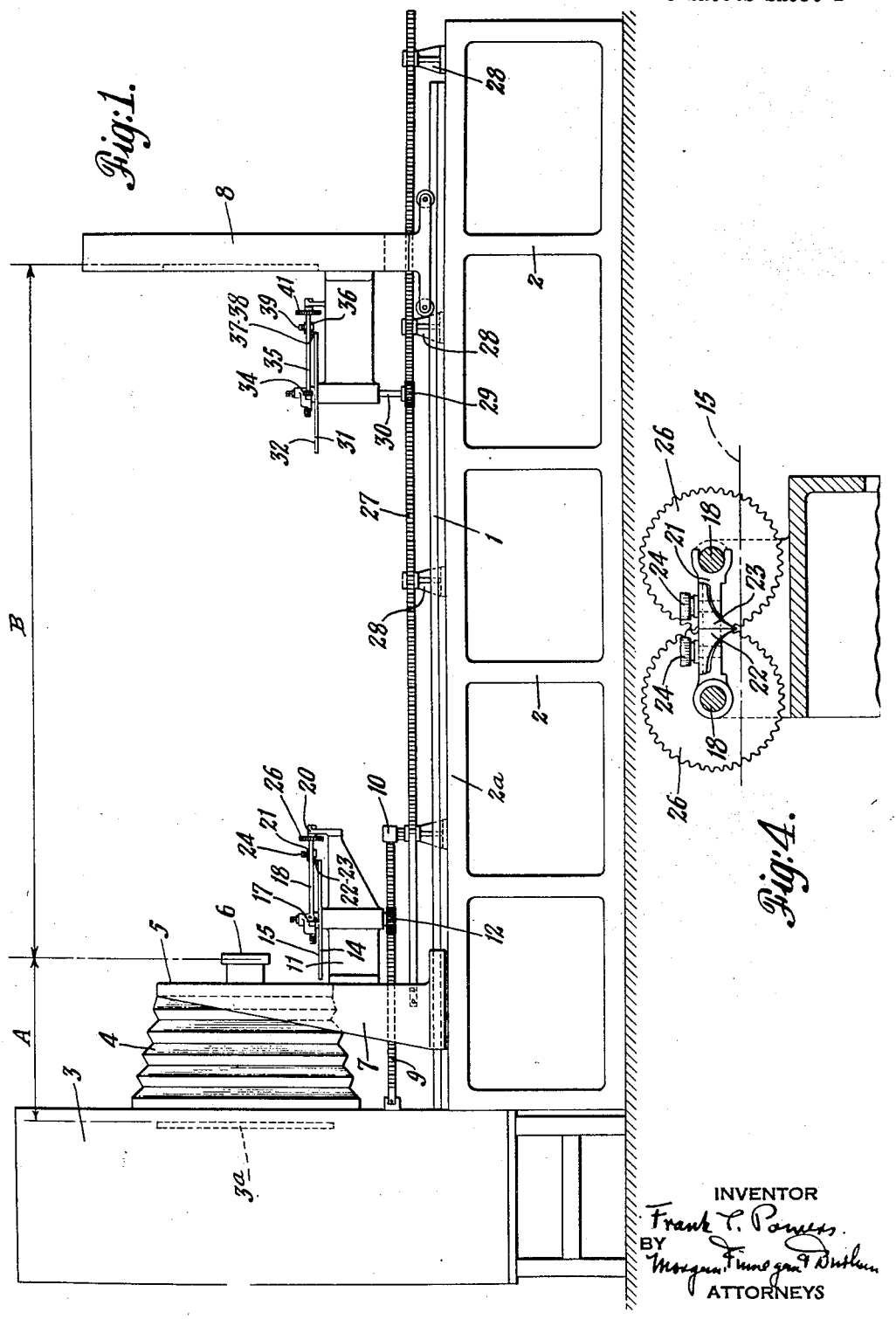
INVENTOR
Frank T. Powers
BY
ATTORNEYS

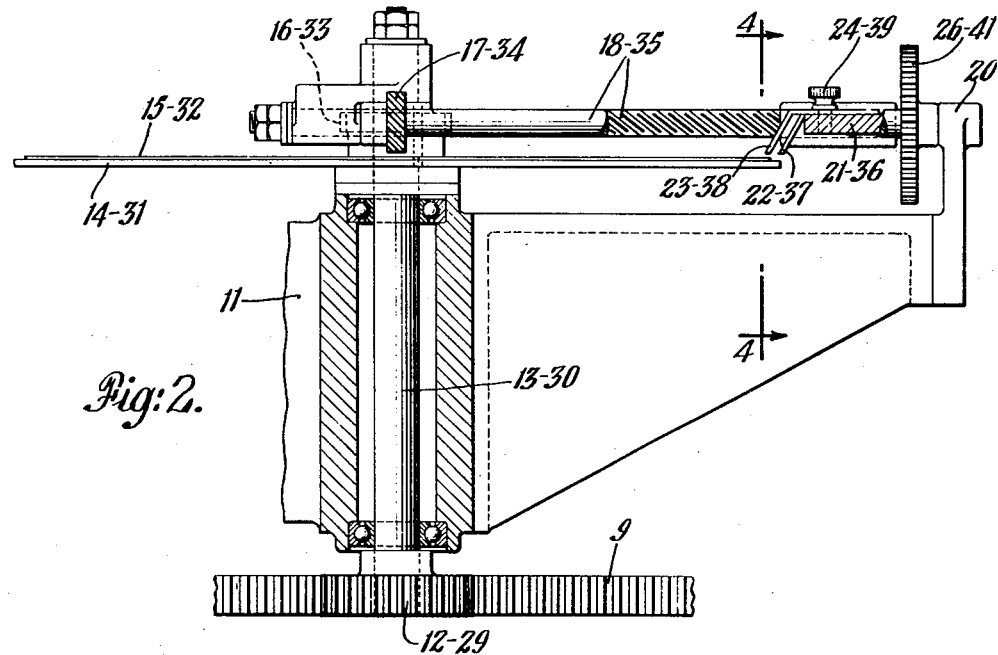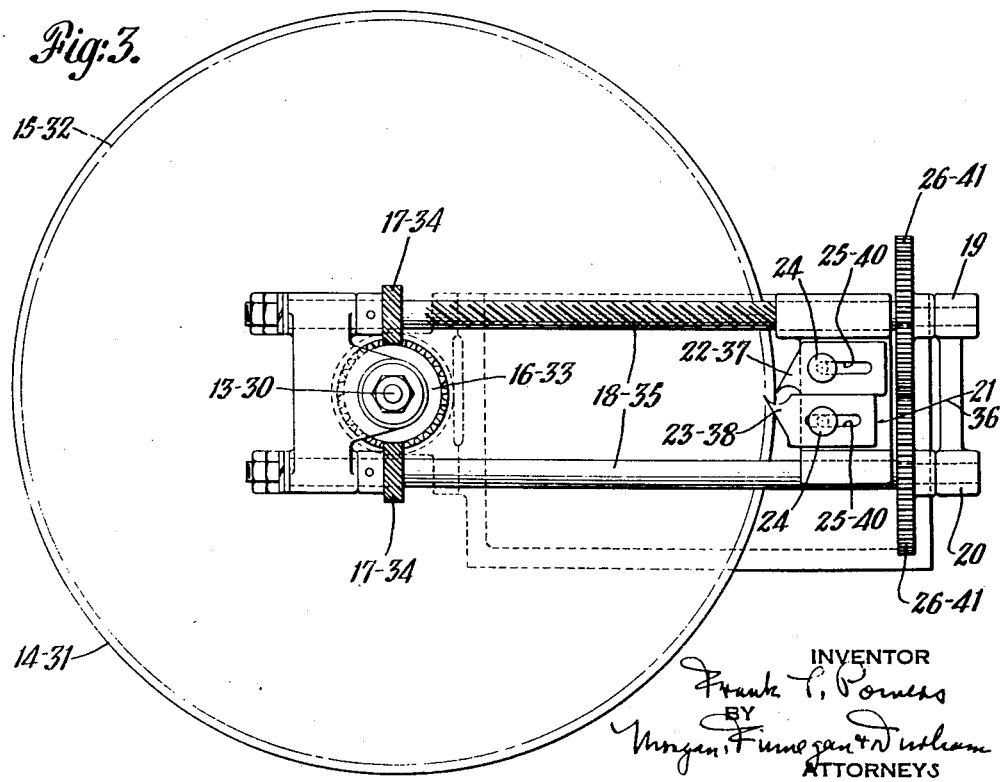

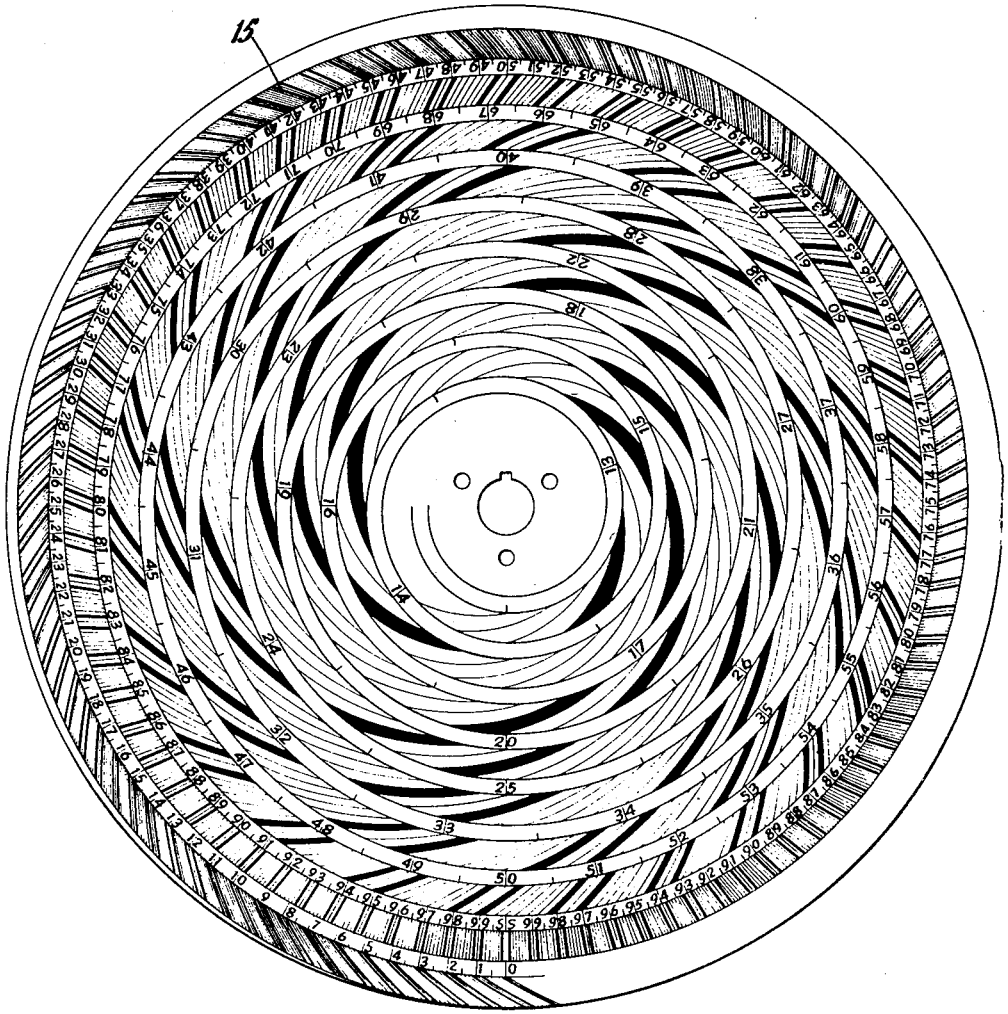

Patented May 23, 1950

2,508,649

UNITED STATES PATENT OFFICE 2,508,649

SPIRAL FOCUSING SCALE

Frank T. Powers, Glen Cove, N. Y.; Frank T. Powers, Jr., and John M. Powers, executors of said Frank T. Powers, deceased, assignors to Powers Photo Engraving Company, a corporation of New York Application April 4, 1947, Serial No. 739,415

4 Claims. (Cl. 88—24)

My invention relates to the art of photoengraving cameras and more particularly to improvements in focusing scales for use in conjunction with process or photoengraving cameras.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The object of my invention is to increase the accuracy of focusing and the convenience of the operation of photoengraving cameras to which my improved focusing scales and mechanisms are attached.

Of the drawings:

Figure 1 is a side elevation of a process or photoengraving camera embodying my invention;

Figure 2 is a side elevation, partly in section of a dial scale and its actuating means;

Figure 3 is a top plan view of the dial scale-and-pointer coordinating mechanism shown in Figure 2;

Figure 4 is a sectional view taken on the line 4—4 of Figure 2 and showing the parts of Figures 2 and 3; and Figure 5 is a detail view showing the scale markings of the dial scale shown in Figures 2 and 3.

A commonly used type of process camera, such as is shown in Figure 1 consists essentially of a bed frame 2a composed of two parallel rails 1 carried on suitable supports 2, a film box 3 in which a plate or film 3a is supported in the focal plane, a bellows 4, a lens board 5, a lens 6, a support 7 for the lens board 5 which is carried by and is slidable along the rails 1. Also movable along rails 1 is a copy board 8. There is also provided, as an accessory to such process camera, suitable artificial lighting equipment, either attached to the support of the copy board or independently supported, which I have not shown in the drawing since it is not essential to a comprehensive description of my invention.

The above enumerated components constitute essential or common parts of process cameras such as are well known in the art and form no part of the present invention. In carrying out my invention I preferably employ the following parts and additions to a process camera.

A rack 9 is attached to, and one end is supported by the film box 3, this rack is additionally supported by bracket 10 attached to the bed frame 2a of the camera.

Bracketed to the lens board support 7 is a dial scale-and-pointer coordinating mechanism for the minor scale, shown in assembly in Figure 3, of which the bracket 11 is the support. A spur gear 12, which engages the rack 9, is rigidly attached to vertical shaft 13, to the upper end of which shaft is attached the disc 14 upon the upper face of which is accurately engraved or otherwise marked, the multiple revolution dial scale 15, shown in greater detail in Figure 5.

Also attached to the shaft 13, is a spiral gear 16, which meshes with two spiral gears 17, one on either side, which gears are mounted on rods one of which is threaded, rotatable in bearings 19 and 20. A pointer carriage 21 engages both of the rods 18, and carries pointers 22 and 23, which are longitudinally adjustable independently of each other by means of thumb screws 24 passing through slots 25. The pair of inter-meshing spur gears 26, mounted on rods 18 assures the maintenance of accurate coordination of rotary motion between rods 18 and consequently of spiral gears 17 and thus minimizes backlash or lost motion. It will be obvious that any motion of the lens board support 7 relative to the film box 3 to which the rack 9 is attached will result in a rotation of the gear 12, shaft 13, spiral gears 16 and 17 and rods 18, causing the pointer carriage 21 to advance or recede along rods 18 depending upon the direction of the motion of the lens board support 7 with respect to the film box 3. The rotation of shaft 13 also causes a rotation of the disc 14 on which is the scale 15.

Bracketed to the copyboard 8 is a dial-scale-and-pointer mechanism for the major scale, similar in construction to that above described for the minor scale. The rack 27 is rigidly attached at one end to support 7 and is additionally slidably supported by brackets 28 attached to bed plate frame 2a. This rack 27 engages spur gear 29 attached to vertical shaft 30 which carries the disc 31 upon the upper surface of which is etched, engraved or otherwise accurately marked the major scale 32. Also mounted on the upper end of the shaft 30 is spiral gear 33 which engages spiral gears 34 attached to rods 35 one of which is threaded, which pass through pointer carriage 36 which carries pointers 37 and 38 which are adjustable by means of thumb screws 39 and slots 40. A pair of intermeshing spur gears 41 on rods 35 insure maintenance of accurate coordination of rotary motion between rods 35 and eliminate backlash or lost motion. Thus means are provided which are preferably and illustratively toothed gears for coordinately moving the pointers 22 and 23 or 37 and 38 and the disc 14 or 31 in accordance with movement of the scales along the rack 9 or 27.

The operation of this major scale mechanism is similar to that above described for the minor scale mechanism. A movement of the copyboard 8 relative to the lens support 7 being in this case the actuating cause.

While the spiral scale may be formed on a cylindrical or circular surface extending throughout a plurality of convolutions having a small pitch, so that several revolutions are required to go from one end to the other of the scale, I prefer to use an involute spiral of constant pitch on the surface of a circular disc, the spiral comprising from about 6 to 10 convolutions, and is so shown in Figure 5.

The spiral dial scales 15 and 32 are so constructed and coordinated with the pointer mechanism that the scale dials make one revolution each when the copyboard 8 is removed a distance substantially equal to the focal length of the lens 6, and the camera has been properly refocused.

For example if the focal length of the lens of the camera is nominally 45 cm., spur gear 29 is chosen for such a pitch diameter that movement of the copy board 8 along the rails 1 would cause the spur gear 29 and consequently the scale disc 31 to which it is rigidly attached to make one revolution each 45 cm. of travel. It follows, therefore, that the circumference of the spur gear 29 at its pitch diameter must be substantially equal to the nominal focal length of the lens. During this movement the one complete rotation of the shaft 30 and spiral gear 33 would cause a rotation of rods 35, one of which has a thread with a pitch such that the pointer carriage 21 is moved a distance exactly equal to the pitch of the spiral scale. I find in practice that a pitch of approximately one-half inch is satisfactory. The spiral scales upon the two discs 14 and 31 are preferably identical. The outer portion of the scale serves chiefly as the minor scale and the inner portion chiefly as the major scale.

Since one revolution of the dial scale is substantially equivalent to a movement of the spur gears 12 and 29 along racks 9 and 27 respectively, a distance equal to the focal length of the lens, it is possible, utilizing my invention to adapt this mechanism to lenses of focal lengths either greater or less than 45 cm. by substituting for spur gears 12 and 29 other gears of either greater or lesser pitch diameter or number of teeth.

The required condition is that the circumference of these gears shall be substantially equal to the effective focal length of the particular lens to be used with each pair of dial scales.

In practice it is found that lenses are seldom or never of constant focal length for both reducing and enlarging and they rarely have an effective focal length exactly equal to their nominal focal length. Thus a lens having a nominal focal length of say 45 cm. may be found upon careful calibration to have a focal length of 45.2 cm. when reducing and a focal length of 44.9 when enlarging.

To adapt my scale to meet these variations I construct my spiral scale as shown in Figure 5 with position lines drawn at a varying angle to radii on the spiral scale. These position lines are not straight lines but the loci of a plurality of position points for lenses of exact focal lengths near the nominal focal lengths of the lens in use. By making my position lines advance ½" relative to the spiral scale for each revolution, I am able to draw a suitable scale to cover lenses of 45.00 cm. to 45.75 cm. If I desire to make the scale to cover a greater variation I will use a spiral of greater pitch so that my position lines may be longer.

Thus the position lines are progressively more and more inclined as they depart from the 1:1 ratio position, designated as "SS" and on any radius, the greater the outward spacing from the spiral scale the smaller the number indicated by the pointer.

The inner portion of the scale, that is the inner ends of the position lines is correct for the exact nominal focal length of the lens, as for example for a lens having a focal length of exactly 45 cm. The outer ends of the diagonal lines are correct for a lens having a focal length of 45.75 cm. Therefore, the scale when used in conjunction with 90 tooth spur gears may be used with lenses having any actual focal length between 45 cm. and 45.75 cm.

If a lens of slightly greater or lesser focal length, as for example 44.5 cm. or 46 cm. is used, the 90 tooth gear may be replaced with a gear having 89 or 91 teeth respectively. The scale is then accurate for actual focal lengths between the limits of 44.5 cm. and 45.25 for 89 tooth gears and for actual focal lengths between 45.5 cm. and 46.25 cm. for 91 tooth gears.

The two sets of pointers 22, 23 and 37, 38 for the minor and major scales 15 and 32 respectively may be individually variably located radially of their respective scales. One pointer of each set (22, 37) serves for indicating the position on the spiral scales 15 and 32 when reducing, while the other pointers (23, 38) serve when the lens is acting as an enlarging lens. Thus, if the lens has a longer focal length when reducing, the corresponding pointers are spaced further from the center of their corresponding dial.

The present invention thus provides a process or copying camera having scales which when properly adjusted permit accurate focusing of the camera, whether it is enlarging or reducing. The scales for different cameras and for different focal length of lens may all be duplicates as major variations in focal length may be compensated for by changes in gearing and minor variations by variably moving the pointers 22, 23, 37 and 38 on the scales 15 and 32 and the desired degrees of accuracy is obtained by careful setting of the pointers at one degree of enlargement and at another degree of reduction.

The invention in its broader aspects is not limited to the specific mechanisms shown and described but departures may be made therefrom within the scope of the accompanying claims without departing from the principles of the invention and without sacrificing its chief advantages.

What is claimed is:

1. In a process camera having a film support, a copy support and a lens between said supports, focusing means including in combination two rotary scale members, one rotated by relative movement of the film support and lens and the other by relative movement of the lens and copy board and two independently movable index means for each rotary scale member one being variably positionable for reduction and the other variably positionable for enlarging, each scale member having thereon an elongated scale comprising a plurality of convolutions and a series of progressively increasingly inclined lines between said convolutions to cooperate with said index means.

2. Focusing means as claimed in claim 1 in which one dial is gear driven by relative movement of the lens and the other dial is gear driven by relative movement of the lens and copy board, and the scales are involute spirals.

3. Focusing means as claimed in claim 1 in which the dials are driven at equal gear ratios by the movement of the lens relative to the film support and copy board.

4. Focusing means as claimed in claim 3 in which each dial has an intermediate point for samesize photographing and the inclined lines are oppositely directed in their inclination away from said intermediate point.

FRANK T. POWERS.

REFERENCES CITED

The following references are of record in the file of this patent:

UNITED STATES PATENTS

| Number | Name | Date |
|---|---|---|
| 1,527,420 | Levy | Feb. 24, 1925 |
| 1,755,177 | Fruwirth | Apr. 22, 1930 |